(12) United States Patent
Noonan

(10) Patent No.: US 8,762,201 B1
(45) Date of Patent: Jun. 24, 2014

(54) ADVERTISEMENT SYSTEM, METHOD AND COMPUTER PROGRAM PRODUCT

(75) Inventor: Kevin Michael Noonan, New York, NY (US)

(73) Assignee: Amdocs Software Systems Limited, Dublin (IE)

( * ) Notice: Subject to any disclaimer, the term of this patent is extended or adjusted under 35 U.S.C. 154(b) by 1154 days.

(21) Appl. No.: 11/492,325

(22) Filed: Jul. 24, 2006

Related U.S. Application Data

(60) Provisional application No. 60/800,483, filed on May 15, 2006.

(51) Int. Cl.
*G06Q 30/00* (2012.01)

(52) U.S. Cl.
USPC ...................................................... 705/14.41

(58) Field of Classification Search
None
See application file for complete search history.

(56) References Cited

U.S. PATENT DOCUMENTS

| | | | |
|---|---|---|---|
| 7,158,943 B2 * | 1/2007 | van der Riet | 705/14 |
| 2003/0014312 A1 * | 1/2003 | Fleisher | 705/14 |
| 2003/0216968 A1 * | 11/2003 | Barnhart | 705/14 |
| 2005/0097204 A1 * | 5/2005 | Horowitz et al. | 709/223 |
| 2005/0222906 A1 * | 10/2005 | Chen | 705/14 |
| 2006/0041470 A1 * | 2/2006 | Filho et al. | 705/14 |
| 2006/0041480 A1 * | 2/2006 | Briggs | 705/14 |
| 2007/0038516 A1 * | 2/2007 | Apple et al. | 705/14 |

OTHER PUBLICATIONS

"View32 Report" Comcast Spotlight pp. 1-10.
Jim Forkan "Clients Plan to Gauge TV Ad Effectiveness" Multi-Channel News, Dec. 24, 2001.
John Consoli "The WB Licenses IAG Research's TV Ad Data" Aug. 17, 2005.

* cited by examiner

*Primary Examiner* — Daniel Sorkowitz
(74) *Attorney, Agent, or Firm* — Zilka-Kotab, PC

(57) ABSTRACT

A system, method and computer program product are included for correlating information. In particular, first information associated with an advertisement presented utilizing a first medium is identified. In addition, second information associated with user activity involving a second medium is received. In use, the first information and the second information are correlated for gauging an effect of the advertisement on the user activity involving the second medium.

17 Claims, 11 Drawing Sheets

| VOD | | System Home | Channel | Channel | Channel | | |
|---|---|---|---|---|---|---|---|
| | | PORTAL | VOD1 | VOD2 | VOD 3 | IPG1 | IPG2 |
| | Ad Units (AU's) | | | | | | |
| | Static Display Ad | 50 | 10 | 10 | | | |
| | Flash Ad | | | 10 | | | |
| | Video Ad | | | | | | |
| | Interactive Video Ad | | | | | | |
| | Web Banner Ad | | | | | | |
| | Frame Crawl | | | | | | |
| | iTV Opps (TB defined further) | | | | | | |
| | Sponsored Frame | | | | | | |
| | Add Ons | | | | | | |
| | Interactive directories | | | | | | |
| | Local / Regional / National Search Box | | | | | | |
| | Please Call Button | | | | | | |
| | Please Email Me Box | | | | | | |
| | Video Pause with DVR (ala Mistro TV) | | | | | | |
| | Partner Synd/Affiliate Mgmt | | | | | | |

FIGURE 4A

| ONLINE PROPERTIES | | | | | | | | | | | |
|---|---|---|---|---|---|---|---|---|---|---|---|
| Site Name | Total Unique Visitors | Average Time Spent Per Visit | Total Visits | Total Page Views | Total Ad Views | Banner Ads CPM | Banner Ad Type | Banner Ads ROI | Video Ads CPM | Video Ads Types | Sponsorship CPM | Sponsorship Type |
| Comcast.net | | | | | | | | | | | | |
| ETC | | | | | | | | | | | | |
| ETC | | | | | | | | | | | | |
| ETC | | | | | | | | | | | | |
| Types of Banner Ads: | | | | | Types of Video Ads | | | | | | |
| See IAB formats and sizes | | | | | 5s | | | | | | |
| | | | | | 10s | | | | | | |
| | | | | | 15s | | | | | | |
| | | | | | 30s | | | | | | |
| | | | | | 60s | | | | | | |
| | | | | | 2 mins | | | | | | |

| | O | P | Q | R | S | T | U |
|---|---|---|---|---|---|---|---|
| | Online Orders | Phone Orders | Wireless Orders | Retail Orders | Incremental Totals | Incremental LTV or Incremental Averages/Action | Media Optimizer Calcualtor® Score — based on past identical buys and indentical creative |
| Previous totals above new totals (Columns O-P can be standalone lead Dashboard Summary Top Sheet also) | 6,194 10,145 | 0 786 | 0 122 | 0 12 | | | |
| | $27,870.00 | $12,786.00 | $3,456.00 | $2,456.00 | 11,065 | 2,766.25 | 702.81 |
| | 163.80 | 100.00 | 100.00 | 100.00 | $46,568.00 | 267.66 | |
| | 0.25 | 0.15 | 0.05 | 0.17 | 3,211.97 | | |
| | 40.95 | 15.00 | 5.00 | 17.00 | 1.00 | 21.16 | 75.47 |
| | | | | | 253.95 | | |
| | 0.161250731 | 0.059065928 | 0.019688643 | 0.066941385 | 1.00 | | |
| etc | 6194 | etc 1234 | etc 568 | etc 837 | etc | etc | etc |
| | 21,357 | | | | 24,046 | 6,011.50 | 1643.46 |
| | $113,456.00 | $7,987.00 | $4,987.00 | $21,384.00 | $147,814.00 | 479.94 | |
| | 344.80 | 100.00 | 100.00 | 100.00 | 5,759.34 | | |
| | 0.25 | 0.15 | 0.05 | 0.17 | 1.00 | 60.95 | 403.48 |
| | 86.20 | 15.00 | 5.00 | 17.00 | 731.41 | | |
| | 0.117854906 | 0.02050831 | 0.006836103 | 0.023242751 | 1.00 | | |

500

DASHBOARD　　　DASHBOARD　　　DASHBOARD　　　DASHBOARD　　　DASHBOARD

500

| V<br>Previous<br>Media Optimizer<br>Calcualtor® Score | W<br>Creative Call-to<br>Action<br>Equalizer<br>Coefficient | X<br>Media Optimizer<br>Calcualtor® Score<br>based on past identical<br>buys & different creative | Y<br>Impact Of<br>TV Ad<br>On Sales<br>Online; Phone<br>Wireless, Retail | Z<br>ACTUAL<br>ROI | AA<br>Including<br>Overheads |
|---|---|---|---|---|---|
| 345 | 0.70 | 492.27 | $46,568.00 | 191.41% | 143.56% |
| 12.13 | 0.70 | 53.13 | | | |
| etc | etc | etc | etc | etc | etc |
| 345 | 0.70 | 1150.72 | $147,814.00 | 417.39% | 313.04% PULL DOWN for O/H % |
| 12.13 | 0.70 | 282.74 | | | |

FIGURE 5D

ADVERTISEMENT SYSTEM, METHOD AND COMPUTER PROGRAM PRODUCT

RELATED APPLICATION(S)

The present application claims priority of a provisional application filed May 15, 2006 under Application No. 60/800,483, which is incorporated herein by reference in its entirety for all purposes.

BACKGROUND AND FIELD OF THE INVENTION

The present invention relates to advertisement management applications, and more particularly to techniques for managing the optimization of advertisements.

SUMMARY

A system, method and computer program product are included for correlating information. In particular, first information associated with an advertisement presented utilizing a first medium is identified. In addition, second information associated with user activity involving a second medium is received. In use, the first information and the second information are correlated for gauging an effect of the advertisement on the user activity involving the second medium.

BRIEF DESCRIPTION OF THE DRAWINGS

FIGS. 4A-4C illustrate exemplary interfaces for presenting advertising opportunities to advertisers, in accordance with yet another embodiment.

FIGS. 5A-5D show a dashboard for distributing content, in accordance with another embodiment.

DETAILED DESCRIPTION

Figure 1:
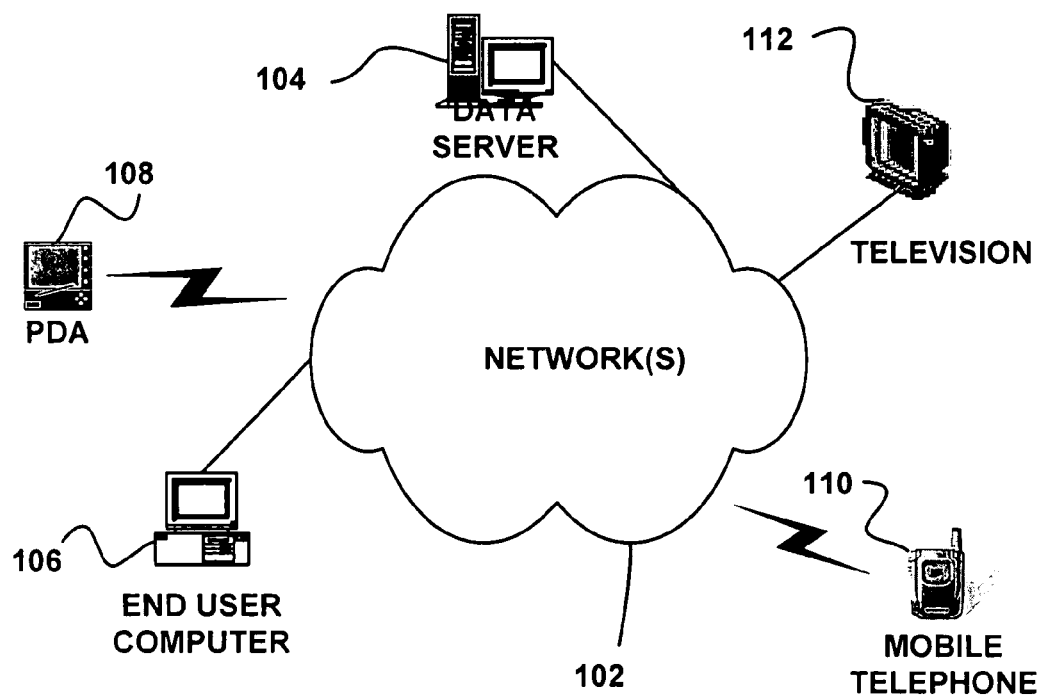
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, broadcast network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

It should be noted that any of the foregoing devices in the present network architecture 100, as well as any other unillustrated hardware and/or software, may be equipped with the capability of gauging an effect of an advertisement. More information regarding such capability will be set forth hereinafter in greater detail during reference to subsequent figures.

Figure 2:
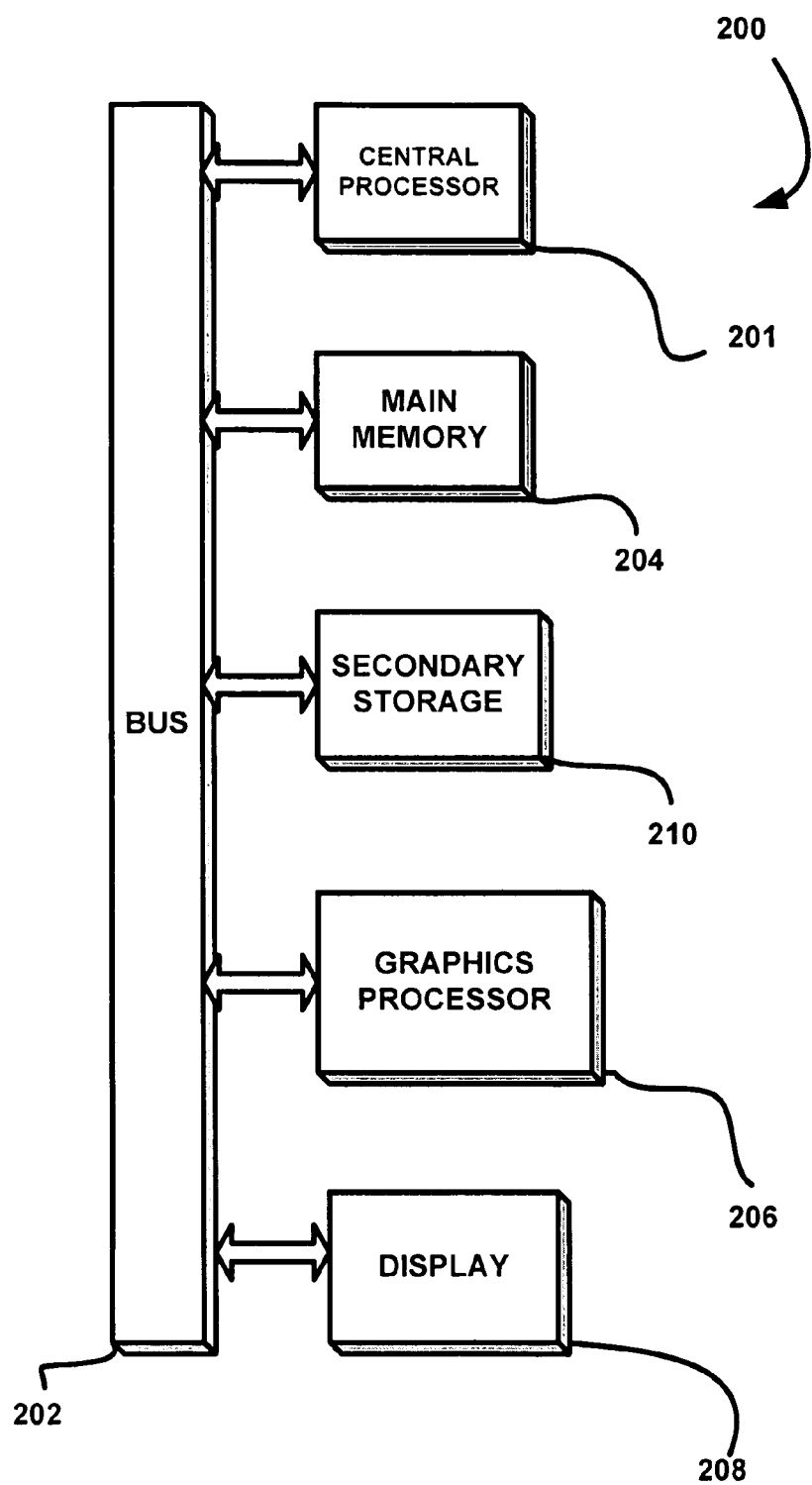
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 600 to perform various functions. Memory 204, storage 210 and/or any other storage are possible examples of computer-readable media.

Figure 3:
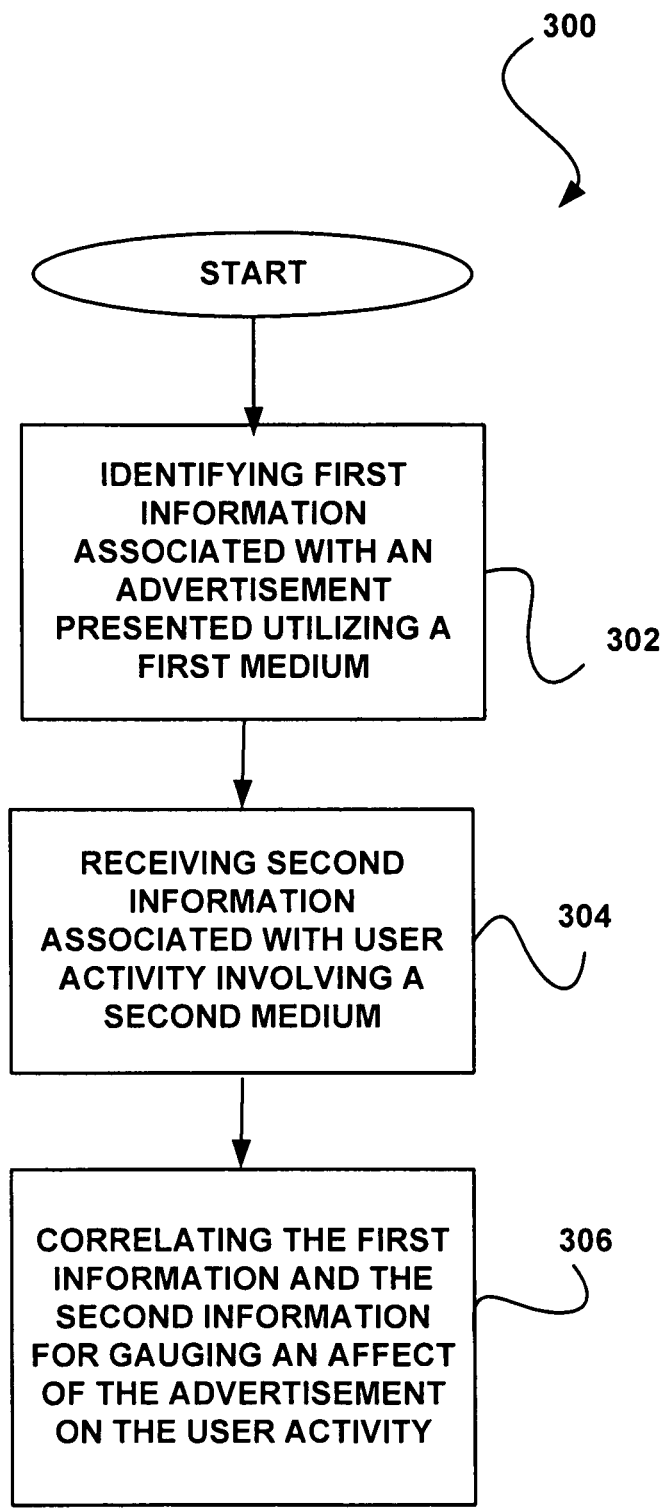
FIG. 3 shows a method for gauging an effect of an advertisement, in accordance with one embodiment.

FIG. 3 shows a method 300 for gauging an effect of an advertisement, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown, in operation 302, first information is identified which is associated with an advertisement presented utilizing a first medium. For example, the advertisement may be presented to at least one user (e.g. viewer, etc.). In the context of the present description, the term advertisement may refer to a survey, questionnaire, promotional content, and/or anything that is designed to attract the attention of the user in regards to a good and/or service.

In various embodiments, the first information may include a time at which the advertisement was presented, a duration of the advertisement, a price of the advertisement, a number of users to which the advertisement was presented and/or any other information capable of being associated with a presented advertisement. Furthermore, in some embodiments, the first medium may include a television medium, a website medium, and/or a mobile device medium. Of course, it should be noted the first medium may include any one or more mediums capable of presenting an advertisement.

Next, in operation 304, second information is received which is associated with user activity involving a second medium. In one embodiment, the second information may be received automatically. As another option, the second information may be requested and thus received in response to a request, in the context of a more manual embodiment. Of course, the second information may be received in any desired manner. Just by way of example, the second information may be received from an advertiser associated with the advertisement. It should be noted, however, that the second information may be received from any entity capable of providing information associated with user activity involving the second medium.

In some embodiments, the user activity may include visiting a web site associated with the advertisement, purchasing a good and/or service associated with the advertisement, communicating with a representative associated with the advertisement (e.g. by telephone, email, short message service (SMS), etc.), and/or any other actions capable of being taken by the user utilizing the second medium. To this end, in various embodiments, the second information may include a number of visits to a site of the advertiser, a number of electronic mail registrations, a number of search queries, a number of search engine marketing queries, a number of purchases of good and/or services, a number of communications between consumers and representatives associated with the advertisement, and/or any other information capable of being associated with user activity involving the second medium.

Still yet, in the context of the present description, the second medium may include a television medium, a web site medium, a mobile device medium, a search engine medium, an electronic mail medium and/or any other one or more mediums capable of being associated with user activity. In one embodiment, the second information may also be associated with user activity involving a plurality of different second mediums. For instance, the plurality of different second mediums may include any of the mediums described above. In different embodiments, the first medium and the second medium may or may not be of a different type.

To this end, the first information and the second information may be correlated to gauge an effect of the advertisement on the user activity. See operation 306. In particular, the correlating may, in one embodiment, include identifying the second information that is associated with user activity that took place during a time period relevant to a time at which the advertisement was presented. For example, the time period may include a predefined time period (e.g. 5 minutes, etc.) after the advertisement was presented. Of course, it should be noted that the correlating may be performed in any desired manner.

Further, the gauging may include calculating a score representative of the effect of the advertisement on the user activity involving the second medium. As an option, such weighting may be user-configured. As another option, the score may be calculated by weighting various mediums associated with the user activity differently. Thus, weights associated with particular types of mediums may be greater than weights associated with other types of mediums.

Still yet, the score may be calculated based on additional information. Just by way of example, such additional information may be associated with a previously presented advertisement. However, any desired scoring and/or gauging method may be utilized to gauge an effect of the advertisement on the user activity.

More illustrative information will now be set forth regarding various optional architectures and uses in which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
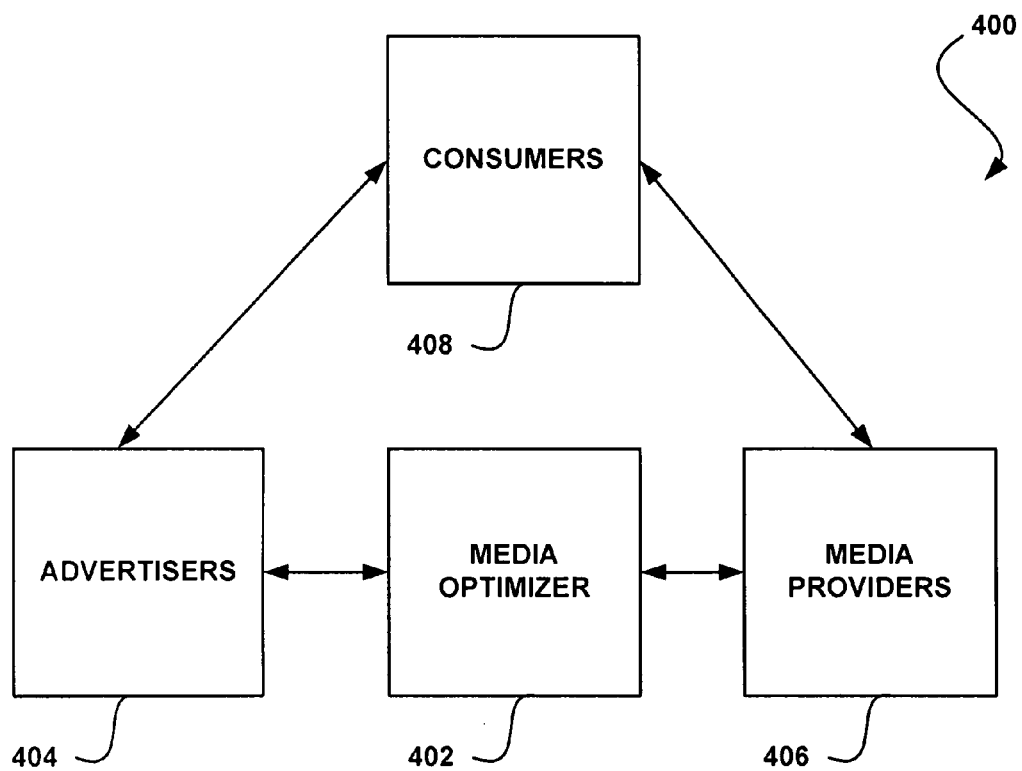
FIG. 4 shows a system for gauging an effect of an advertisement, in accordance with another embodiment.

FIG. 4 shows a system 400 for gauging an effect of an advertisement, in accordance with another embodiment. As an option, the system 400 may be implemented in the context of the details of FIGS. 1-3. Of course, however, the system 400 may be carried out in any desired environment. Further, the aforementioned definitions may equally apply to the description below.

As shown, included is a plurality of advertisers 404, a plurality of media providers 406, a plurality of users (e.g. consumers 408 or at least potential consumers, etc.) and a media optimizer 402. In use, the media optimizer 402 receives a plurality of advertising opportunities (e.g. slots, etc.) from the media providers 406. Such opportunities may be identified by channel, advertisement type, etc. and may further relate to a plurality of different mediums.

Figure 4C:
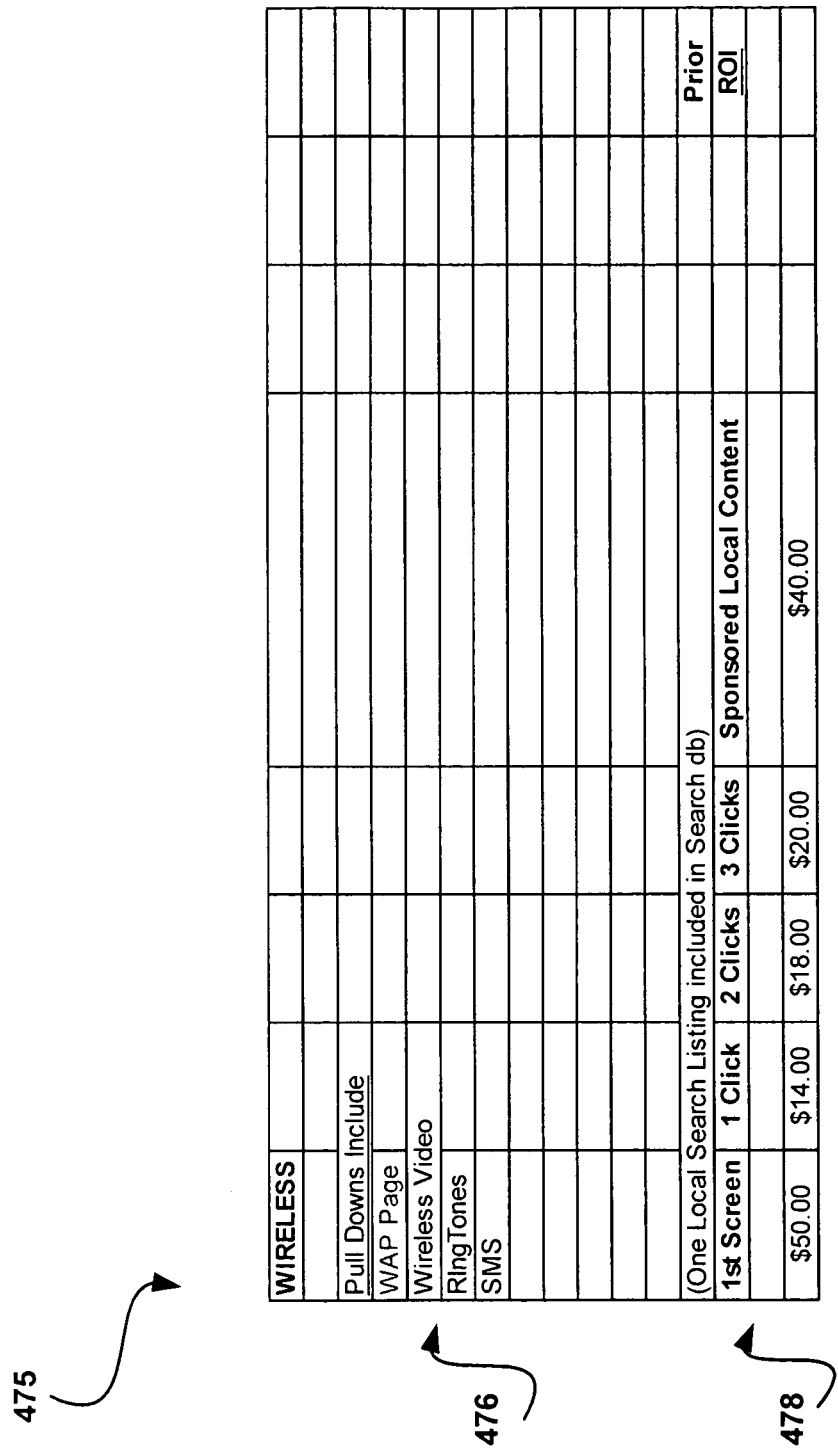
Figure 5A:
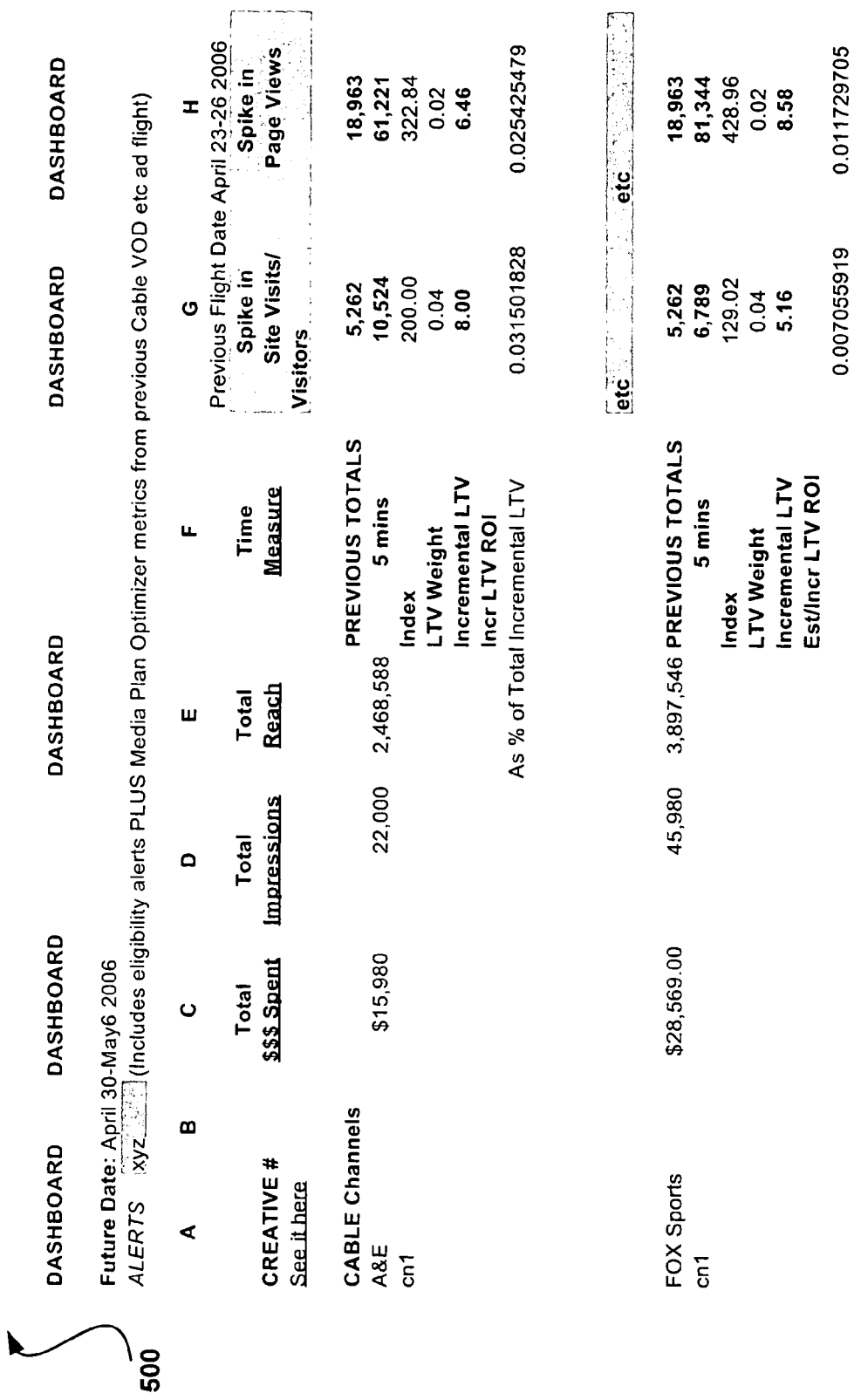
Figure 5B:

Given such advertising opportunities, the media optimizer 402 aggregates the same for presentation to the advertisers 404. FIGS. 4A-4C illustrate exemplary interfaces with which this may be accomplished, and will be described in further detail below. Of course, such interfaces are set forth for illustrative purposes only.

The media optimizer 402 then receives selections of the advertising opportunities from the advertisers 404, and then forwards the same to the appropriate media providers 406. Of course, in other embodiments, the advertisement selections may be communicated directly between the advertisers 404 and the media providers 406 (with the media optimizer 402 simply being made aware of the same). In any case, the media optimizer 402 stores first information associated with such selections (e.g. timeframe, pricing, reach, etc.), for reasons that will soon become apparent.

To this end, the advertisements may be presented (e.g. run, displayed, broadcasted, etc.) by the media providers 406, such that the consumers 408 are presented the same. In response to such advertisements, the consumers 408 may interact with the advertisers 404 in a variety of ways (e.g. visiting a website, communicating with a representative associated with the advertisement by e-mail, etc.). Just by way of example, such interaction may be initiated by a consumer selection of an advertisement.

So that an effectiveness of the advertisements in influencing such consumer activity may be gauged, along with estimating financial returns on investments, the media optimizer 402 receives second information describing the aforementioned consumer activity. While such information may be received in any desired way, it may, in one embodiment, be received utilizing an XML feed from the advertisers 404. The media optimizer 402 may then correlate the first and second information so that such correlation may be presented to the advertisers 404.

To this end, the system 400 allows the advertisers 404 to quantify the effectiveness a specific (e.g. TV, Internet, etc.) advertisement had on motivating consumers 408 that viewed the advertisement to complete desired targeted actions across various types of media. Such targeted actions may include, for example, online activities and/or consumer purchases across multiple types of media. Of course, such targeted actions may include any type of actions capable of being performed in response to the presentation of the advertisement.

The system 400 allows advertisers 404 to index performance of an advertisement against estimates or empirical data. Further, the system 400 also allows for each desired consumer action to be weighted by the advertisers 404. Such weighting may allow advertisers 404 to more precisely predict the effect the advertisement had on the associated advertiser's overall website (e.g. offline and/or wireless). Just by way of example, weights may be applied to specific types of consumer interactions as well as telephone and/or retail purchases.

In this way, the effectiveness of advertisements of a first media type may be determined based on consumer actions performed in response to such advertisements utilizing any number of various media types. For example, the effectiveness of television advertisements may be determined based on consumer actions taken in response to such television advertisements. Specifically, such consumer actions may include signing up for emails and/or promotions, purchasing goods and/or services utilizing the Internet, contacting a representative of an advertiser associated with one of the television advertisements via telephone, etc.

Furthermore, the effectiveness of an advertisement may be determined for entities with an interest in the advertisement (e.g. a creative services provider, a sales and research department, the advertiser, etc.). Thus, the system 400 allows an advertiser 404 to correlate an advertisement shown on specific networks, times, and geographies and the effect such advertisement had on desired actions within other media types (e.g. online, phone, retail). Still yet, estimated returns on investments associated with such actions may also be determined.

Specifically, in one optional embodiment, if a television advertisement is produced and presented on a specific network or channel to motivate viewers to go online to an advertiser's web site and sign up for a promotion, the difference in the number of online and integrated promotion sign-ups after 5 minutes of presenting the advertisement, or any predefined time period, resulting from that advertisement may be measured, quantified, and reported. As an option, the measuring, quantifying and reporting may be performed by the advertiser and/or the advertiser's vendors and may be reported to the system 400 utilizing XML. Of course, any desired method of reporting such data may be utilized.

Based on the report, spikes of consumer activity may then be identified and assigned an index. Of course, the index may be calculated by the advertiser based on performance spikes that occurred a previous time the advertisement, or even a different advertisement associated with the advertiser, was presented on the same media (e.g. channel, time, etc.).

The index may also be assigned a weight by the advertiser. The weight may represent the relative importance that a particular type of consumer action signifies to the advertiser's intent for a particular advertisement. The total weights of all consumer actions associated with an advertisement may be scaled at 1.00. Furthermore, such various weights and associated consumer actions may be defined by an advertiser or any entity associated with an advertisement for increased flexibility.

Moreover, the system 400 may include a score calculator. The score calculator may optionally allow sales representatives in the field, researchers, marketers, media planners, etc. associated with an advertisement to integrate and optimize purchase options across multiple media types for consumers in real time. In this way, an average revenue per sales call may be increased.

In particular, the score may optionally allow for trending data associated with advertisements that have been presented on specific channels with effects of such advertisements on online/offline usage and actions by consumers. Table 1 shows exemplary factors that may be included in calculating the score. Of course, it should be noted that such factors are just by way of example only, and are not to be construed as limiting in any manner.

TABLE 1

| | |
|---|---|
| 1) | Actual Spikes |
| 2) | Indexed Spikes |
| 3) | Incremental life time value (LTV) and/or Estimated incremental LTV return on investment (ROI) |

In one embodiment, the score may be the difference between the last incremental LTV and the current score. Of course, the score may be calculated in any desired manner. To this end, the optimizer 402 is a tool that allows an advertiser to define an expected level of success. The expected level of success may therefore represent a 100% index.

The advertiser may also report on the spikes in consumer actions and assign a weight to each consumer action based on an importance to an associated advertisement campaign and subsequent consumer actions. The advertiser may further calculate an incremental LTV index based on the spikes after the advertisement was presented and then may weight the index. The index may be utilized to compare results across the online and/or offline consumer actions. The score may then be calculated as the difference between the current score and at least one previous score. Furthermore, the score may be multiplied by 100. In one embodiment, a score of 100 may be a perfect score.

The consumer actions may also be assigned an estimated incremental LTV ROI by multiplying predefined conversion rates by incremental actual spikes in consumer actions with media due to an advertisement being presented at certain time, from a specific media outlet, and/or to a specific demographic.

FIGS. 4A-4C illustrate exemplary interfaces 425, 450 and 475 for presenting advertising opportunities to advertisers, in accordance with yet another embodiment. As an option, the interfaces 425, 450 and 475 may be implemented in the context of the details of FIGS. 1-4. Of course, however, the interfaces 425, 450 and 475 may be carried out in any desired environment. Again, the aforementioned definitions may equally apply to the description below.

As shown in FIG. 4A, a video on demand interface 425 may be displayed to advertisers. The video on demand interface 425 may display available advertising opportunity types 426. Such advertising opportunity types 426 may include static display advertisements, flash advertisements, video advertisements, etc. The video on demand interface 425 may also display options 428 that are potentially applicable to any of the advertising opportunities. The display options 428 may include an interactive directory presented with an advertisement, a search field presented with an advertisement, call and/or email options presented with an advertisement, etc.

Furthermore, the video on demand interface 425 may display available advertising opportunities 430 associated with such advertising opportunity types 426 and options 428. As shown, the available advertising opportunities 430 may be displayed according to particular media (e.g. system home portal, specific television channels, etc.). Thus, for instance, a number of available advertising opportunities 430 for each advertising opportunity type 426 and/or option 428 may be displayed for each particular media. In this way, advertisers may view the video on demand interface 425 to identify and/or select specific types of advertising opportunities 430 available through video on demand.

As shown in FIG. 4B, an online interface 450 may be displayed to advertisers. The online interface 450 may display website properties 454 for specific websites 452. As shown, for each website 452 a plurality of associated properties 454, including property types and property values, may be displayed. As an option, such properties may be displayed based on a predetermined amount of time.

Specifically, the website properties 454 may include a number of unique visitors that visited the website, an average time each visitor spent on the website, a total number of visits to the website, a total number of advertisements that were viewed via the website, advertisement opportunities available on the website, etc. Thus, advertisers may be provided with information on properties of websites such that the advertisers may select a desired website for displaying their advertisements.

As also shown in FIG. 4C, a wireless interface 475 may be displayed to advertisers. The wireless interface 475 may display wireless advertising opportunities 476. Such wireless advertising opportunities 476 may optionally be displayed according to wireless provider (not shown). The wireless advertising opportunities 476 may include, for example, wireless video, ring tones, short message service (SMS), etc.

Furthermore, the wireless interface 475 may display available search listing opportunities 478. The search listing opportunities may include, for example, an advertising slot located in a search database of a search engine. Thus, an advertiser may utilize the wireless interface 475 to identify and/or select wireless advertising opportunities 476 and available search listing opportunities 478.

FIGS. 5A-5D show a dashboard 500 for distributing content, in accordance with another embodiment. As an option, the dashboard 500 may be implemented in the context of the details of FIGS. 1-4. Of course, however, the dashboard 500 may be carried out in any desired environment. Again, the aforementioned definitions may equally apply to the description below.

The dashboard 500 may include any graphical user interface (GUI) capable of displaying data. In particular, the dashboard 500 may be utilized to display data associated with advertising across any media types. Thus, for instance, an advertiser may view the dashboard 500 for identifying results of advertisements displayed across multiple media types.

As shown in column A, specific media types utilized by an advertiser for advertising may be displayed. In this way, advertising results data may be displayed for each media type. Column A may optionally provide a pull down menu, such that the advertiser may select results of a particular media type to view. As also shown in column A, a target demographic may be selected by an advertiser for viewing sample results of a presented advertisement (i.e. "see it here" as shown in column A). As another option, the advertiser may be allowed to select qualitative data from a pull down list in order to compliment the targeting capabilities of a demographic more precisely.

Column C displays a total amount of money spent on advertising and column D displays total impressions (e.g. total number of advertisements actually presented, etc.). Additionally, column E displays a total reach of an advertisement associated with each media type. The total reach may include, for example, a total number of viewers of the advertisement. This data may or may not be fed from third-party sources.

Further, column F displays a time period for which the data populating the dashboard has been collected. The time period may be predefined or customized. As shown under column F, each category of data (i.e. column) may be displayed in various formats. For example, an index of the data may be displayed, where such index represents an average number of current data for a particular category over an average number of previous data for the same particular category.

Thus, for instance with respect to a category of data involving a number of viewers of a media type different than the media type associated with the presented advertisement, where the viewers viewed the different media type based on the presented advertisement, the index may represent an average number of viewers of the different media type within the predefined time period over a previous number of viewers within the same time period for a previous presentation of the same or different advertisement. As an option, the same time period may include a same amount of time and/or a similar time of day.

Table 2 illustrates on exemplary algorithm for calculating an index. It should be noted that such algorithm is just by way of example only, and that any desired algorithm may be utilized to calculate an index of advertisements across a particular media type.

TABLE 2

Index = (current number of viewers/previous number of viewers) * 100

Thus, in the particular example shown in column G, the index for the number of views of a web site may be (10,524/5,262)*100; this may be calculated as (X2−X1)/X1. Of course, however, any level of success (e.g. 100 as shown in Table 2) may be utilized by an advertiser for calculating the index. As an option, the index may also be calculated based on averages associated with a single advertisement viewed across multiple media types. As yet another option, the index may further be based on averages calculated across different time periods.

As another option, the advertiser may define the algorithm that calculates the index. For example, a 25% increase in email newsletter registrations might be considered a top measure of success for a particular advertiser. Thus, the advertiser can assign an index of 200 to the 25% increase. In this example, every single percentage point above and below the 25% real incremental level may index above or below the 200 benchmark set by the advertiser. In this way, a specific creative effect on other media consumption and transactions may be tested. Conversely, a 125 index can be defined by the user as an actual spike of 25% versus the empirical norm for that media type (e.g. creative, network, demographic, time slot, etc.).

Each category of data may also be displayed in an LTV weight format. The LTV weightings may represent the ability of a category of data to generate revenue, such as for example in the form of an expected value. Just by way of example, an email address may be of great value to an advertiser. Thus, an LTV for an email address may be assigned a value of $300 with a weight of 20 out of 100 to represent the relative advertiser value. In use, the total sum of the LTV weightings across all categories of data may equal 1.0. Thus, if it is desired that all columns have an equal LTV, 100 may be divided by the total number of categories of data in order to assign each category of data the same weight Furthermore, such LTV weightings may be calculated based on previous advertising data. For instance, an advertiser may select to base such weights on specific data by selecting one of several check boxes of data types. Of course, however, the LTV weightings may be calculated in any desired manner. Furthermore, for reach category of data the LTV weighting may be entered manually or may optionally be selected from a predetermined list.

For example, an email address can have a $300 value, such that when a predetermined number email addresses get opened up and customers associated with such email addresses purchase a good and/or service, the advertiser earns $300 on that sale resulting from the email registration. In one exemplary embodiment, if the LTV of an acquired email is estimated to be $300, and the open rate is 20%, the click-through rate is 10% and the purchase rate is 1.5%, 10,000 email registrations would be multiplied by these percentages to ascertain the estimated financial LTV of such a desired action. A pull-down for a "With Overhead ROI" calculation may enable the advertiser to adjust for a specific overhead rate or allocation on any given advertisement, and may be separate and distinct from the cost of the advertising opportunity.

Moreover, each category of data may also be displayed in an incremental LTV format. The incremental LTV format may be calculated based on the index described above multiplied by the LTV weight. Of course, however, the incremental LTV format may be calculated in any desired manner.

As an option, each category of data may include an incremental LTV ROI format. Table 3 illustrates one exemplary algorithm that may be utilized in calculating the incremental LTV ROI. Of course it should be noted that such algorithm is just by way of example only and should not be construed as limiting in any manner.

TABLE 3

Incremental LTV ROI = (LTV weight) * (average number of current data for the associated category) * (conversion rate estimations)

As an option, the conversion rate estimations that may be utilized to calculate the incremental LTV ROI value may be default values or customized values. In addition, the conversion rate estimations may include expected or empirical conversion rates normally experienced by the advertiser in all media types. If such rates are not known, the conversion rate estimations may include industry averages. Of course, however, the conversion rate estimations may include any values capable of defining a rate of conversion of current data associated with a particular category.

Just by way of example, if the LTV weight of a newly double-opted in email newsletter subscriber is estimated by the advertiser to be worth $300, this $300 may be multiplied by the actual number of email newsletter registrations experienced after the advertisement has been presented. The resultant number may then be multiplied by an associated conversion rate.

As shown in column G, the dashboard 500 may display data regarding the number of views of a web site in association with an advertisement. In particular, column G may display the difference between the total number of web site visits and the number of web site visits both before and after the advertisement was presented. As an option, the web site visit data may be based on web site activity information received from the advertiser in an XML format and/or third-party vendors utilized by the advertiser (e.g. MSN, Yahoo, Google, etc.).

Column H may display data regarding the number of views of a particular web page within the web site described above with respect to column G. Such data may be calculated in the same or similar manner as described with respect to column G. As an option, web page activity information may be received from the advertiser.

Column I may display data regarding a number of email registrations (e.g. registrations for newsletters, etc.) associated with a presented advertisement. Such data may be calculated in the same or similar manner as described above with respect to column G. In particular, column I may display the difference between the total number of email registrations and the number of email registrations both before and after the advertisement was presented. Additionally, email registration information may be received from the advertiser.

Column J may display data regarding pay-per-click (PPC) search engine marketing (SEM) queries associated with a presented advertisement. Such data may be calculated in the same or similar manner as described above with respect to column I. Further, PPC SEM query information may be received from third party vendors utilized by the advertiser. As an option, the PPC SEM query information may be sorted and/or reported based on keywords.

Column K may display data regarding a number of internal search queries associated with a presented advertisement. Such data may be calculated in the same or similar manner as described above with respect to column J. In addition, internal search query information may be identified based on keywords searched, re-directs to a home web page, etc.

Columns L, M and N may display data regarding interactive marketing functionalities utilized in association with a presented advertisement. As shown, such interactive marketing functionalities may include Performance Based Marketing (PBM) sign-ups, online integrated promotions (OIP) registrations and/or time spent per visit. It should be noted, however, that data regarding any interactive marketing functionalities may be utilized. Again, such interactive marketing information may be calculated in the same or similar manner as described above with respect to Column I.

Columns O, P, Q and R may display data regarding purchase orders made in association with a presented advertisement. As shown, such purchase orders may include online order, phone orders, wireless orders and/or retail orders. Of course, such purchase orders may include any type of purchase order capable of being made in response to a presented advertisement. For example, the purchase orders may include purchase orders received in response to a consumer clicking on a link in an email from the advertiser and subsequently purchasing something within a specific period of time after the email has been received by consumer. In one embodiment, purchase order information may be received from the advertiser.

Column S may display data associated with incremental totals of columns O, P, Q and R. Thus, column S may display data associated with a total number of purchase orders of all calculated types. Specifically, column S may display a total retail value (e.g. in terms of dollars, etc.) associated with a presented advertisement.

Column T may compare the current incremental LTV Average or Incremental Averages/Action described above to a previous incremental LTV Average or Incremental Averages/Action number. The difference between such may then be a media optimizer score, which will be described in further detail with respect to column U.

Column U may display data regarding a Media Optimizer Calculator™ (MOC™) score that is associated with a presented advertisement. Table 4 shows an exemplary algorithm for calculating the MOC™ score. Of course, such algorithm is just for example only, and should not be construed as limiting in any way.

TABLE 4

$1^{st}$ Time calculating MOC Score ™ value = (Current incremental LTV Average or Incremental Averages/Action - Previous incremental LTV Average or Incremental Averages/Action) divided by Previous incremental LTV Average or Incremental Averages/Action * 100)
Subsequent MOC ™ Score value = (Previous MOC ™ Score - Current incremental LTV Average or Incremental Averages/Action) divided by Previous MOC ™ Score * 100

In this way, actual values associated with viewer actions and/or ROI values may be calculated based on a total amount of money spent on a particular advertisement. In addition, weights may be applied to each media type or consumer interaction touch point by taking each index score as a percentage of a total index increase/decrease rating of all media types or consumer interaction touch points. A score may then be calculated based on these indices and weights, which may consequently gauge success experienced the last time the advertiser presented an associated advertisement in a similar manner (e.g. on that channel, at that time, to that demographic, etc.).

Just by way of example, each column associated with viewer actions may be scored with index numbers. These may further be aggregated and then divided by 12 (e.g. total number of columns, etc.) to arrive at a simple overall score. This Incremental Life Time Value Average number is then compared to the previous MOC™ Score and the difference may be the new MOC™ Score.

Thus, if the total incremental LTV of 12 columns is 253.03, this may be divided by 12, which results in an LTV average of 21.16. This average may therefore show that the associated advertisement running on the particular media is associated with an average of 21.16. If a previous advertisement only resulted in a MOC™ score of 12.13, the previous advertisement would not be as highly optimized as the advertisement presentation that rendered 21.16.

Specifically, this Score tells the advertiser, sales representative, marketer, researcher, media planner, etc that the previous presentment of the advertisement resulted in a score below what the advertiser experienced on the presentation of the advertisement where it rendered a 21.16 Incremental LTV Average. These stored data points and creative can be archived for future trending reference and scoring history, so that the user can chose other TV channels and media to buy that will result in optimized scores, based on past data.

Column V may display a previous MOC™ score in association with a presented advertisement. Column V may be automatically populated from empirical advertisement effectiveness data from previous advertisement presentations that have been analyzed. Of course, however, Column V may also be manually defined based on advertiser privileges, also described above in Table 4.

Column W may display an equalizer coefficient for comparing two different advertisements that have been presented on the same media type. The equalizer may lower a subsequent advertisement's LTV weighting for each action column. For example, if the search queries from one channel's audience results in the majority of online sales within minutes of the advertisement running then the advertiser should invest their money in that channel as well as undertaking an aggressive PPC and SEO campaign, etc.

Column X may display data regarding an estimated LTV for different advertisements on the same media, or different media, based on column W. Furthermore, column Y displays an impact of an advertisement when multiple medias (e.g. channels, etc.) are utilized. Specifically, column Y may display the total dollar impact a specific advertisement had on a specific media type, as described above with respect to column S.

Still yet, column Z may display an actual ROI value associated with a presented advertisement. The actual ROI value may be calculated by subtracting a cost of the advertisement from the total sales attributable to the advertisement. Such total sales may include email registrations that led to immediate online, wireless and/or offline sales. As an option, the cost of the advertisement may disregard creative costs.

For example, if after a normal TV advertisement on channel X at time Y in market Z, a particular web site normally experiences 50 email registrations and a subsequent advertisement specifically targeted, optimized, and integrated amongst media types results in an incremental spike in email registrations of 200 (250 total) and immediate subsequent gross sales of $25,000, the difference in email is 200 email registrations. In one embodiment, the 200 email registrations would be reported in column I. In addition, the ROI on the TV advertisement would simply be $25,000 less the cost of the advertisement opportunity. In other embodiments, the ROI may also be represented as a percentage.

For example, if the cost of the advertisement opportunity was $15,980, $9,020 (ROI $25,000-$15,980 cost of that specific advertising opportunity=$9,020) would be displayed in an email ROI column, and may also be displayed as a percentage. Such ROI may be included in the total of column Y.

Moreover, column AA may display an actual ROI that accounts for overhead associated with a presented advertisement. The overhead may include, for example, web charges, call center charges, etc. In addition, such actual ROI with overhead may be calculated based on an advertiser's specifications.

Table 5 illustrates the various potential sources of the data populated in the dashboard 500. Such sources are just by way of illustration only, and should not be construed as limiting in any manner. In particular, the data populating the dashboard 500 may be received from any source capable of providing such data.

TABLE 5

| | |
|---|---|
| Column C: | documents |
| Column D: | documents |
| Column E: | documents |
| Column F: | pull-down menu choice/advertiser |
| Column G: | advertiser or third party vendor |
| Column H: | advertiser or third party vendor |
| Column I: | advertiser or third party vendor |
| Column J: | advertiser or third party vendor |
| Column K: | advertiser or third party vendor |
| Column L: | advertiser or third party vendor |
| Column M: | advertiser or third party vendor |
| Column N: | advertiser or third party vendor |
| Column O: | advertiser or third party vendor |
| Column P: | advertiser or third party vendor |
| Column Q: | advertiser or third party vendor |
| Column R: | advertiser or third party vendor |
| Column S: | calculated |
| Column T: | calculated |
| Column U: | calculated |
| Column V: | calculated |
| Column W: | user-defined |
| Column X: | calculated |
| Column Y: | received and/or calculated |
| Column Z: | calculated |
| Column AA: | calculated |

It should be noted that such columns described above are just by way of example. Thus, any column types capable of being associated with an advertisement may be utilized. In this way, the effectiveness of an advertisement may be calculated and displayed to an advertiser.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method, comprising:
identifying first information associated with an advertisement presented utilizing a first medium, wherein the first information includes a time at which the advertisement was presented, a duration of the advertisement, a price of the advertisement, and a number of users to which the advertisement was presented;

receiving second information associated with user activity involving a plurality of different second mediums;

correlating the first information and the second information for gauging an effect of the advertisement on the user activity involving the plurality of different second mediums, utilizing a processor, wherein the correlating includes identifying at least a portion of the second information that is associated with at least a portion of the user activity that took place during a time period relevant to the time at which the advertisement was presented; and displaying data in a plurality of categories within a graphical user interface (GUI), where the data is determined from the correlating of the first information and the second information, and where the categories include a determined spike in site visits associated with the presentation of the advertisement, a determined spike in page views associated with the presentation of the advertisement, and a determined spike in email registrations associated with the presentation of the advertisement;

wherein the second information includes a plurality of elements including a number of visits to a site of an advertiser, a number of electronic mail newsletter and promotion registrations, a number of search queries, a number of search engine marketing queries, a number of purchases of good and/or services, and a number of telephone, email, and short message service (SMS) communications between consumers and representatives associated with the advertisement;

wherein the gauging includes calculating a score representative of the effect of the advertisement on the user activity involving the plurality of different second mediums, where the score is calculated utilizing a value assigned to each of the plurality of elements included in the second information, and where each value is weighted according to a predetermined importance of each corresponding element assigned by the advertiser;

wherein each category of the plurality of categories is displayed in association with a corresponding incremental life time value return on investment value, and each of the incremental life time value return on investment values is calculated by multiplying a life time value weight of the category by an average number of current data for the category and by a conversion rate.

2. The method of claim 1, wherein the first medium is of a different type than the second mediums.

3. The method of claim 1, wherein the first medium includes a television medium.

4. The method of claim 1, wherein the plurality of different second mediums include at least one of a web site, a search engine, and electronic mail.

5. The method of claim 1, wherein the score is calculated based on additional information associated with a previously presented advertisement.

6. The method of claim 1, wherein the second information is received automatically.

7. The method of claim 1, wherein the second information is requested and received in response to the request.

8. The method of claim 1, and further comprising displaying a plurality of the advertisements for selection.

9. A computer program product embodied on a tangible computer readable medium, comprising:

computer code for identifying first information associated with an advertisement presented utilizing a first medium, wherein the first information includes a time at which the advertisement was presented, a duration of the advertisement, a price of the advertisement, and a number of users to which the advertisement was presented;

computer code for receiving second information associated with user activity involving a plurality of different second mediums;

computer code for correlating the first information and the second information for gauging an effect of the advertisement on the user activity involving the plurality of different second mediums, wherein the correlating includes identifying at least a portion of the second information that is associated with at least a portion of the user activity that took place during a time period relevant to the time at which the advertisement was presented; and computer code for displaying data in a plurality of categories within a graphical user interface (GUI), where the data is determined from the correlating of the first information and the second information, and where the categories include a determined spike in site visits associated with the presentation of the advertisement, a determined spike in page views associated with the presentation of the advertisement, and a determined spike in email registrations associated with the presentation of the advertisement;

wherein the second information includes a plurality of elements including a number of visits to a site of an advertiser, a number of electronic mail newsletter and promotion registrations, a number of search queries, a number of search engine marketing queries, a number of purchases of good and/or services, and a number of telephone, email, and short message service (SMS) communications between consumers and representatives associated with the advertisement;

wherein the gauging includes calculating a score representative of the effect of the advertisement on the user activity involving the plurality of different second mediums, where the score is calculated utilizing a value assigned to each of the plurality of elements included in the second information, and where each value is weighted according to a predetermined importance of each corresponding element assigned by the advertiser;

wherein the computer program product is operable such that each category of the plurality of categories is displayed in association with a corresponding incremental life time value return on investment value, and each of the incremental life time value return on investment values is calculated by multiplying a life time value weight of the category by an average number of current data for the category and by a conversion rate.

10. A system including a tangible computer readable medium, comprising:

a computer executable module embodied on the tangible computer readable medium and in communication with advertisers and a media provider, the module for correlating:

first information associated with an advertisement presented by the media provider utilizing a first medium, wherein the first information includes a time at which the advertisement was presented, a duration of the advertisement, a price of the advertisement, and a number of users to which the advertisement was presented, and second information received from an advertiser, the second information associated with user activity involving a plurality of different second mediums;

wherein the correlating is for gauging an effect of the advertisement on the user activity involving the plurality of different second mediums, and the correlating includes identifying at least a portion of the second information that is associated with at least a portion of the user activity that took place during a time period relevant to the time at which the advertisement was presented;

wherein the system is operable to display data in a plurality of categories within a graphical user interface (GUI), where the data is determined from the correlating of the first information and the second information, and where the categories include a determined spike in site visits associated with the presentation of the advertisement, a determined spike in page views associated with the presentation of the advertisement, and a determined spike in email registrations associated with the presentation of the advertisement;

wherein the second information includes a plurality of elements including a number of visits to a site of the advertiser, a number of electronic mail newsletter and promotion registrations, a number of search queries, a number of search engine marketing queries, a number of purchases of good and/or services, and a number of telephone, email, and short message service (SMS) communications between consumers and representatives associated with the advertisement;

wherein the gauging includes calculating a score representative of the effect of the advertisement on the user activity involving the plurality of different second mediums, where the score is calculated utilizing a value assigned to each of the plurality of elements included in the second information, and where each value is weighted according to a predetermined importance of each corresponding element assigned by the advertiser;

wherein the system is operable such that each category of the plurality of categories is displayed in association with a corresponding incremental life time value return on investment value, and each of the incremental life time value return on investment values is calculated by multiplying a life time value weight of the category by an average number of current data for the category and by a conversion rate.

11. The method of claim 1, wherein the user activity includes at least one of visiting a web site associated with the advertisement, purchasing a good associated with the advertisement, purchasing a service associated with the advertisement, and communicating with one of the representatives associated with the advertisement.

12. The method of claim 1, wherein the time period includes a predefined time period after the advertisement was presented utilizing the first medium.

13. The method of claim 1, wherein gauging the effect of the advertisement on the user activity involving the plurality of different second mediums includes quantifying an effectiveness the advertisement had on motivating consumers that viewed the advertisement to complete desired targeted actions across the plurality of different mediums, and the targeted actions include online activities and consumer purchases across the plurality of different mediums.

14. The method of claim 1, wherein the categories further include a determined spike in pay-per-click (PPC) search engine marketing (SEM) queries associated with the presentation of the advertisement, a determined spike in internal search queries associated with the presentation of the advertisement, a determined spike in performance based marketing (PBM) sign-ups associated with the presentation of the advertisement, a determined spike in online integrated promotions (OIP) registrations associated with the presentation of the advertisement, and a determined spike in time spent per visit associated with the presentation of the advertisement.

15. The method of claim 14, wherein the data displayed in each of the plurality of categories is displayed as an index value, where the index value is calculated for the data by dividing a value of the data for a current time period by a value for the data for a previous time period and multiplying the result by 100.

16. The method of claim 1, wherein each category of the plurality of categories is displayed in association with the life time value weight of the category, where the life time value weight for each category includes a value associated with an assigned importance of the category.

17. The method of claim 1, wherein the conversion rate for each category of the plurality of categories includes an expected conversion rate normally experienced by the advertiser when the conversion rate for the category is known, and the conversion rate for each category of the plurality of categories includes an industry average when the conversion rate for the category is not known;

wherein the life time value weight for each category of the plurality of categories is determined by the advertiser, and a total of all the life time value weights is equal to 1.0.

* * * * *